United States Patent [19]
Beier

[11] 4,023,427
[45] May 17, 1977

[54] APPARATUS FOR TENSIONING A SAFETY BELT

[75] Inventor: Edmar Beier, Wolfsburg, Germany

[73] Assignee: Volkswagenwerk Aktiengesellschaft, Germany

[22] Filed: Jan. 21, 1976

[21] Appl. No.: 650,878

[30] Foreign Application Priority Data
Feb. 11, 1975 Germany .......................... 2505624

[52] U.S. Cl. ................ 74/242.1 FP; 74/242.14 R; 180/82 C
[51] Int. Cl.² ..................... F16H 7/12; F16H 7/10; B60K 27/00; B60R 19/00
[58] Field of Search ........... 180/82 C; 74/242.14 R, 74/242.1 FP

[56] References Cited
UNITED STATES PATENTS

| 3,838,746 | 10/1974 | Andres | 180/82 C |
| 3,871,470 | 3/1975 | Schwanz et al. | 180/82 C |
| 3,942,819 | 3/1976 | Schwanz et al. | 180/82 C |

Primary Examiner—Leonard H. Gerin
Attorney, Agent, or Firm—Brumbaugh, Graves, Donohue & Raymond

[57] ABSTRACT

Apparatus for tensioning a safety belt, in which tension is applied to the belt through the action of a piston in a working cylinder, includes a mechanism for blocking the reverse action of the piston in the cylinder following the application of pressure. The reverse motion blocking mechanism includes at least one wedge, movable along a slide surface in response to the application of gas pressure, and toothings on the piston into which the wedge may be lodged to prevent reverse motion of the piston following the application of tension to the safety belt.

9 Claims, 1 Drawing Figure

APPARATUS FOR TENSIONING A SAFETY BELT

BACKGROUND OF THE INVENTION

This invention relates to apparatus for tensioning a safety belt, and in particular to such apparatus wherein tension is applied by piston displacement in a working cylinder in response to gas pressure. In such devices it is desirable to provide a mechanism for preventing reverse motion of the piston after completion of the tension action.

In order to avoid personal discomfort, very often safety belts are applied by vehicle occupants with rather loose tension. Maximum safety for the occupant, however, necessitates that the safety belt be applied rather firmly to provide restraint in the event of an accident. In U.S. patent 3,871,470, Schwanz has described an apparatus for increasing the tension of a safety belt in response to a vehicle accident. This type of apparatus operates with a vehicle mounted sensor, which in response to the occurrence of an accident provides a signal, which detonates an incendiary device to provide gas pressure. The pressure from the incendiary device causes a piston within a cylinder to be moved, thereby applying tension to the safety belt. The apparatus described by Schwanz includes a reverse stop clamping device acting similar to a free wheel and consisting of griping jaws in ring shaped arrangement about the piston rod. The griping jaws described by Schwanz are located in a conical housing arranged such that the reverse motion of the piston causes blocking of the griping jaws into position. The device as described by Schwanz contains a comparatively large number of parts, many of which must be accurately machined with high quality finishes and narrow tolerances. Production of the Schwanz device is therefore considerably expensive.

Another seat belt tensioning device is described by Schwanz et al. in allowed U.S. patent application Ser. No. 572,328, filed Apr. 28, 1975 now U.S. Pat. No. 3,951,430. The device described in Schwanz's later application includes a less expensive reverse motion blocking device, but only provides for blocking of the piston in one position.

It is therefore an object of the present invention to provide apparatus for tensioning a safety belt with a reverse motion blocking mechanism, which is simple and inexpensive to construct.

It is a further object of the present invention to provide such a belt tensioning apparatus with a reverse blocking mechanism which will provide blocking of the tensioning device in a plurality of blocking positions.

SUMMARY OF THE INVENTION

In accordance with the present invention there is provided apparatus for tensioning a safety belt in response to applied gas pressure. The apparatus includes a cylinder and a piston, displaceable in the cylinder in a forward direction in response to the gas pressure and having toothings. The apparatus also includes at least one slide surface, inclined relative to the axis of the cylinder and mounted to the cylinder. There is further provided at least one blocking wedge, supported on the slide surface and displaceable in response to the gas pressure to engage the toothings, thereby blocking the motion of the piston in a reverse direction. Finally there is provided means, interconnecting the piston and the safety belt, for applying tension to the safety belt in a response to the forward motion of the piston.

In accordance with further development of the invention, the toothings may be provided on a square or rectangular piston rod connected to the piston. There may also be provided more than one wedge acting on the piston and engaging the toothings. In a preferred embodiment symmetrical wedges are provided, which may have tooth flanks to more easily engage the toothings on the piston. Springs may be provided for holding the wedges on the slide surface and urging the wedges in the same direction as the applied gas pressure. A loop attached to the piston rod may be provided for engaging the safety belt.

For a better understanding of the present invention together with other and further objects, reference is made to the following description, taken in conjunction with the accompanying drawing, and its scope will be pointed in the appended claims.

DESCRIPTION OF THE INVENTION

Figure 1:
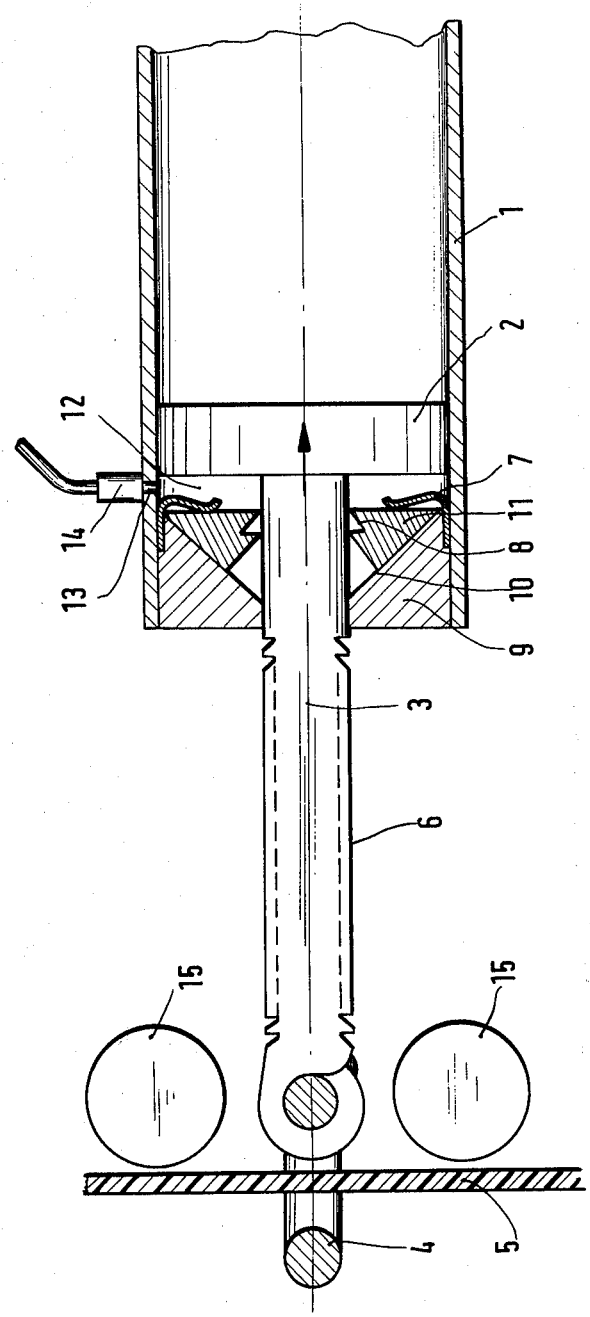
FIG. 1 is a cross-sectional view of a safety belt tensioning apparatus in accordance with the present invention.

FIG. 1 is a cross-sectional view of a safety belt tensioning apparatus in accordance with the present invention. The FIG. 1 apparatus includes a working cylinder 1 within which there is a piston 2. Piston 2 includes piston rod 3 which is attached to safety belt interconnecting means, comprising loop 4 through which passes a safety belt 5 to which tension is to be applied. Piston rod 3 is preferably of a square or other non-circular cross-section and passes through a correspondingly shaped opening in cylinder 1 to prevent a twisting motion of the piston rod and loop 4. Piston rod 3 is arranged to move gas tightly through the bottom portion 9 of the cylinder. The bottom portion 9 is provided with inclined slide surfaces 10 upon which are mounted blocking wedges 11. Blocking wedges 11 are held in position by springs 7 which urge wedges 11 in the same direction as force from gas pressure described below. The cylinder is provided with a gas inlet 13 on which is mounted an incendiary charge 14 which may be detonated in response to an applied signal.

The apparatus of FIG. 1 is primarily usable in a vehicle equiped with an accident detecting device. When an accident occurrence is detected, for example by a sensor protruding from the front of the vehicle, or by a sensor which detects rapid deceleration of the vehicle, incendiary device 14 is discharged causing gas pressure to enter chamber 12 of working cylinder 1 through vent 13. The gas in chamber 12 applies pressure to piston 2 which causes it to move in direction A. Simultaneously gas pressure is also applied to blocking wedges 11, which are provided with toothings 8, which reject the toothings 6 in piston rod 3 when piston 3 is displaced in direction A. When piston rod 3 comes to a rest position, as when sufficient tension has been applied to safety belt 5 by loop 4, wedges 11 will be displaced and engage toothings 6 in piston rod 3, thereby preventing reverse motion of piston rod 3 and safety belt engaging loop 4.

The forward motion in direction A of piston 2, piston rod 3 and loop 4 causes safety belt 5 to be retracted between two fixed points 15, which may be rollers or other support rods, so that belt slack, resulting from loose application of the safety belt to the body of the vehicle occupant is removed.

While the device shown in FIG. 1 makes use of two blocking wedges 11 at the top and bottom surfaces of piston rod 3, those skilled in the art will recognize that it is possible to practice the present invention in an embodiment which includes only a single blocking wedge, using a torsion resistant piston rod having a cross-section which prevents rotation of the piston and piston rod by interaction with the bottom portion 9 of cylinder 1. Likewise it is possible to have an embodiment of the invention which has more than two blocking wedges, however, it is desirable to have the blocking wedges arranged symmetrically about piston rod 3 to insure a uniform blocking engagement.

Those skilled in the art will also recognize that motion of piston rod 3 may be accomplished by means other than an incendiary charge. Stored gas pressure may be released in response to the accident sensing device in the vehicle, thereby effecting the same motion of piston 2 and blocking wedges 11 within cylinder 1.

An examination of the embodiment in FIG. 1 reveals that the principal advantage of the present invention over prior art such as Schwanz U.S. Pat. No. 3,871,470 is that the device is of relatively simple construction and close tolerance machining and finishing is not required.

While there has been described what is believed to be the preferred embodiment of the invention, those skilled in the art will recognize that other and further modifications may be made thereto without departing from the true spirit and scope of the invention, and it is intended to claim all such embodiments as fall within the true scope of the invention.

I claim:

1. Apparatus for tensioning a safety belt in response to applied gas pressure, comprising:
   a cylinder;
   a piston, displaceable in said cylinder in a forward direction in response to said gas pressure and having toothings;
   at least one slide surface, inclined relative to the axis of said cylinder and mounted to said cylinder;
   at least one blocking wedge, supported on said slide surface and displaceable in response to said gas pressure to engage said toothings, thereby blocking the motion of said piston in a reverse direction;
   and means, interconnecting said piston and said safety belt, for applying tension to said safety belt in response to the forward motion of said piston.

2. Apparatus as specified in claim 1, wherein there is provided a spring for holding said wedge on said surface, and said spring applies force to said wedge in the same direction as pressure is applied on said wedge by said gas.

3. Apparatus as specified in claim 1, wherein said piston includes a piston rod having a cross-section other than circular, which is mounted in an opening of said cylinder having a corresponding cross-section, thereby preventing rotation of said piston.

4. Apparatus as specified in claim 3, wherein the cross-section of said piston rod is square.

5. Apparatus as specified in claim 1, wherein said interconnecting means includes a belt loop surrounding said safety belt.

6. Apparatus as specified in claim 1, wherein said wedge includes tooth flanks for engaging the toothings on said piston.

7. Apparatus as specified in claim 1, wherein there are provided a plurality of said slide surfaces and a plurality of said wedges.

8. Apparatus as specified in claim 7, wherein said slide surfaces and said wedges are symmetrically disposed about said piston.

9. Apparatus as specified in claim 1, wherein said toothings on said piston have tooth flanks which are rejecting when said piston is moved in a forward direction.

* * * * *